United States Patent [19]

Salowe

[11] Patent Number: 4,635,258
[45] Date of Patent: Jan. 6, 1987

[54] SYSTEM FOR DETECTING A PROGRAM EXECUTION FAULT

[75] Inventor: Seymour Salowe, Murrysville, Pa.

[73] Assignee: Westinghouse Electric Corp., Pittsburgh, Pa.

[21] Appl. No.: 663,242

[22] Filed: Oct. 22, 1984

[51] Int. Cl.$^4$ ........................................... G06F 11/00
[52] U.S. Cl. .................................... 371/16; 364/200; 371/62
[58] Field of Search ...................... 371/12, 16, 19, 62; 364/200

[56] References Cited

U.S. PATENT DOCUMENTS

| | | | |
|---|---|---|---|
| 4,323,966 | 4/1982 | Whiteside et al. | 364/200 |
| 4,408,328 | 10/1983 | Wakai | 371/62 |
| 4,410,938 | 10/1983 | Higashiyama | 364/200 |
| 4,488,303 | 12/1984 | Abramovich | 371/62 |

Primary Examiner—Charles E. Atkinson
Attorney, Agent, or Firm—W. E. Zitelli

[57] ABSTRACT

A system for detecting a fault in the program execution of a programmed digital signal processing system is disclosed. The fault detection system may include a plurality of monitoring devices for monitoring the execution of a plurality of program portions of the programmed processor and for generating a fault signal in response to a detected faulty program execution condition. Logic circuitry is included for restarting of suspending any fault signal generation rendered by the plurality of monitoring devices. Further included is circuitry for limiting the number of automatic restarts to a predetermined number which avoids continuous cycling between fault signal generation and reset. Still further, the predetermined number of fault generations must occur within a given time interval which may be set and from time to time changed by the program instructions, for example. A fault indication or alarm is not provided until the predetermined number of fault signal generations has occurred within the predetermined time interval. While in the alarm state, the monitoring devices are inhibited, rendering the fault detection system inoperative, and the program execution of the programmed processor is sustained in an initial state. The fault detection system further includes a power supply monitor which disables the logic circuitry when the power supply of the program processor is below a predetermined level to render the fault detection system inoperative and to sustain the program execution at its initial state.

11 Claims, 4 Drawing Figures (BACKGROUND)

(BACKGROUND)

SYSTEM FOR DETECTING A PROGRAM EXECUTION FAULT

BACKGROUND OF THE INVENTION

The present invention relates generally to programmed digital signal processing systems, and more particularly, to a system for detecting a fault in the program execution of the processing system.

Program execution fault monitors, commonly referred to as "deadman" switches, are commonly used in programmed digital signal processing systems to detect a fault in the execution of a program. As shown in the simple block diagram schematic of FIG. 1, the processing system, in executing its program, generates a trigger signal 12 which is monitored by the fault monitor 14. As long as the trigger signal 12 is timely generated, the fault monitor 14 assumes the program execution is performed as desired. However, lack of generation of the trigger signal 12 causes the fault monitor 14 to generate a fault signal 16 which is indicative of a faulty condition in the execution of the program by the processing system 10.

Conventionally, the fault monitor 14 may include a capacitor which is, for example, repeatedly discharged by the generation of the trigger signal 12 at times corresponding to the execution of a program portion of the processing system's program and allowed to charge when that program portion is not being executed. Should the program portion which generates the trigger signal 12 fail to be executed in a timely manner, the capacitor will become charged above a predetermined level thus rendering a fault indication. Other types of fault monitors may include a relay, for example, which remains energized as a result of the timely generation of trigger signals 12 and becomes deenergized upon lack of trigger signal generation, indicating a faulty condition in the program execution.

More sophisticated fault monitoring systems may include circuitry to generate a reset signal 18 each time a faulty condition is manifested. This reset signal may emulate a trigger signal to suspend the fault signal generation and concurrently, reset the program execution to an initial state. Accordingly, the sequential generation of the fault signal and reset signal will cycle continuously if the lack of trigger signal generation is sustained.

Moreover, present programmed digital signal processing systems normally include program portions which may be either periodically executed or conditionally executed. The functional flow chart of FIG. 2 illustrates a program for a processing system including a main program and an interrupt program which is executed upon receiving an interrupt signal. The main program portion may be executed periodically. Referring to FIG. 2, the block 20 depicts the execution of the instructions in the main program portion and the flow line 22 depicts a periodic execution thereof. Concurrently with the execution of the main program portion 20, the processing system may include a functional decisional loop, depicted by the decisional block 24, waiting for either a hardware or a software interrupt. When an interrupt signal occurs, the execution of the main program is suspended and the interrupt program portion depicted by the block 26 is executed. Thereafter, the execution of the main program portion 20 is continued by executing the next instruction thereof.

A problem arises in determining where to insert the instructions for generating the trigger signal. If the trigger signal generation is conducted by the interrupt program portion 26, it will only indicate proper execution thereof, i.e., keep the fault monitor from generating a fault signal. Therefore, a "hang-up" in the execution of the main program portion 20 will not be monitored by the fault monitor 14. Similarly, if the trigger signal generation is conducted by the main program portion 20, then a problem with execution of the interrupt program portion 26 will not be observed by the fault monitor 14.

The present invention proposes to overcome the aforementioned drawbacks and provide additional features to ensure the viability of the program execution fault monitoring operation of the programmed digital processing system.

SUMMARY OF THE INVENTION

Included in a programmed digital signal processing system operative to execute a program is a system for detecting a fault in the program execution thereof. In accordance with the present invention, the program fault detecting system comprises: means for generating a plurality of trigger signals, a plurality of monitoring means, one corresponding to each trigger signal, and logic means. Each trigger signal is indicative of the execution of a corresponding predetermined portion of the processing system's program. Lack of trigger signal generation is indicative of a potentially faulty condition with respect to the execution of the program portion associated therewith. Each monitoring means is operative to generate a fault signal in respond to a lack of generation of its corresponding trigger signal. Accordingly, the logic means is responsive to a fault signal generation from the plurality of monitoring means to generate a reset signal to reinitialize program execution to an initial state, and to generate a restart signal which is provided to the plurality of monitoring means to suspend the fault signal generation.

In accordance with another aspect of the present invention, the fault detection system includes apparatus for monitoring the electrical power supply of the processing system and for generating a low signal when the power supply is below a predetermined level. The logic means responds to the low signal to inhibit the operation of the plurality of trigger signal monitoring means and to maintain the program execution of the processing system in the initial state until the low signal is relieved.

Further, the fault detection system includes apparatus for inhibiting the operation of the plurality of monitoring means upon the generation of a predetermined number of fault signals within a time interval. In one embodiment, the inhibiting means may include a counter for counting the fault signal generations whereupon the counter reaching a predetermined count generates a signal to inhibit the operation of the monitoring means to cause a condition which prevents further program execution. The counter may be initialized at predetermined times in order to set the time interval thereof, whereby if the counter does not reach the predetermined count within the set time interval, the counter is initialized and starts counting again without generating the inhibit signal.

In addition, the electrical power supply monitor may include apparatus for maintaining the counter at an initial state until the power supply becomes greater than a predetermined level. Still further, the fault detection system may include apparatus for generating an alarm signal upon the generation of a predetermined number of fault signals within a time interval.

DESCRIPTION OF THE PREFERRED EMBODIMENT

Figure 1:
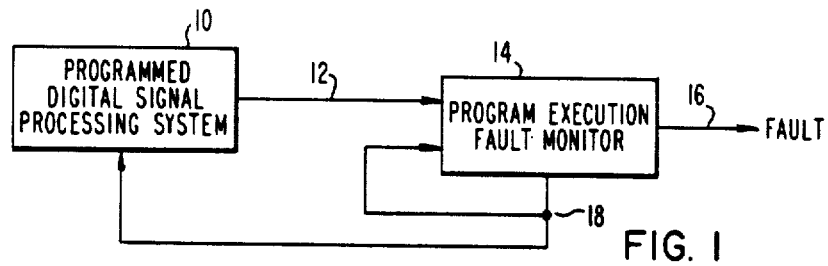
FIG. 1 is a simple block diagram schematic of a programmed digital signal processing system including a program execution fault monitor.
Figure 2:
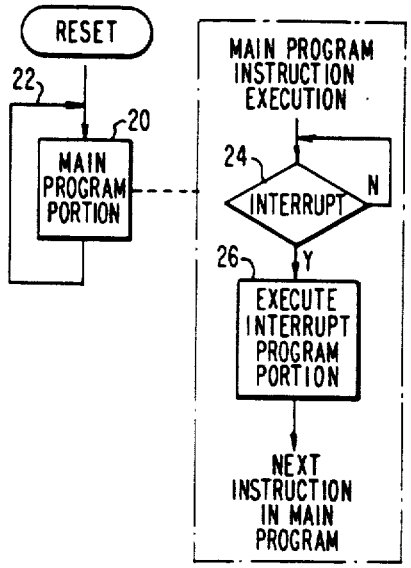
FIG. 2 is a simplified functional program flow chart including a main program and an interrupt program which may be executed in a typical programmed digital signal processing system.
Figure 4:
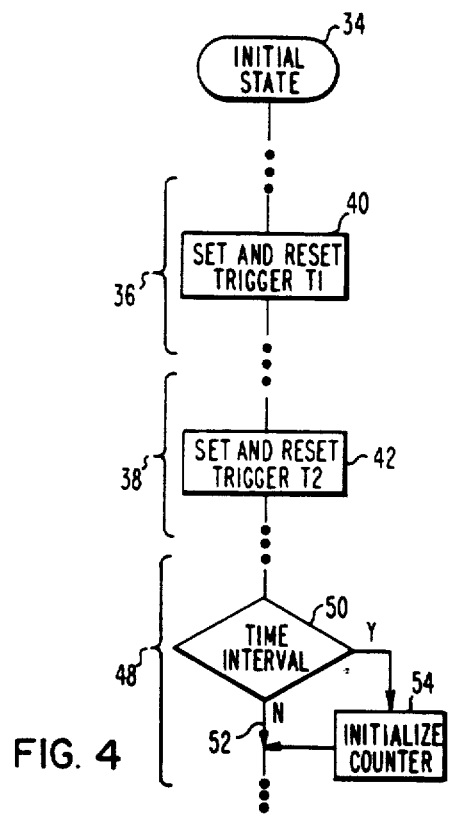
FIG. 4 is an exemplary functional program flow chart suitable for use in the programmed digital signal processing system embodiment of FIG. 3 and used in connection with FIG. 3 for describing the preferred embodiment of the present invention.
Figure 3:
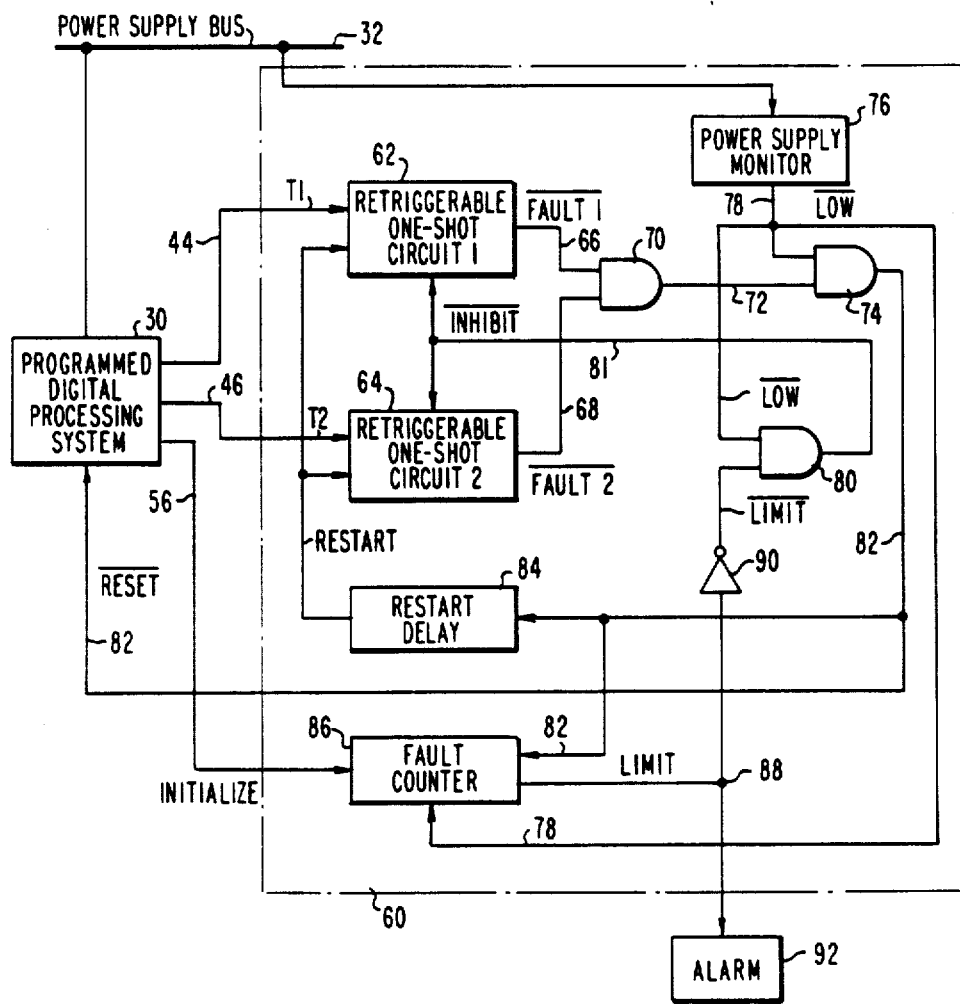
FIG. 3 is a functional block diagram schematic of a programmed digital signal processing system including a program execution fault monitoring system suitable for embodying the principles of the present invention.

The functional block diagram schematic of FIG. 3 and the exemplary functional programming flow chart of FIG. 4 will be used in describing the preferred embodiment in the paragraphs to follow. Referring to FIG. 3, a programmed digital processing system 30 is energized by a power supply bus 32. The processing system 30 may be of a conventional type including a microprocessor or minicomputer, for example, for executing one or more programs or program portions. One such program that the processing system 30 may execute is shown in FIG. 4. This exemplary program includes an initial state at 34 and various program portions shown at 36 and 38, for example. In each of the program portions 36 and 38, there is included instructions for setting and resetting corresponding trigger signals T1 and T2 shown at the blocks 40 and 42, respectively. The trigger signals T1 and T2 are conducted over signal lines 44 and 46, respectively, as shown in the schematic diagram of FIG. 3.

The programming, depicted in FIG. 4, may also include instructions shown at 48 for setting a time interval and generating an initialization signal. The time interval may be determined by the decisional block 50 which may include an internal timing mechanism for counting the number of times the program has been executed, for example, as an indication of the passage of real time. Until the predetermined time interval of 50 is reached, program execution will exit the decisional block 50 at the branch 52. When the time interval is reached, the decisional block branches to the instructional block 54 for generating the initialization signal. This initialization signal may be conducted over the signal line 56 as shown in FIG. 3.

Apparatus for detecting a fault in the program execution of the processing system 30 is shown at 60 in FIG. 3. The apparatus 60 includes a plurality of monitoring devices 62 and 64, for example, corresponding to each trigger signal provided thereto, like the ones depicted in FIG. 3 over signal lines 44 and 46, respectively. The monitoring devices 62 and 64 are preferably conventional retriggerable one-shot circuits which are operative to generate a fault signal in response to a lack of generation of its corresponding trigger signal. The corresponding generated fault signals are conducted over the signal lines 66 and 68 which are provided to downstream logic circuitry. For example, the signal lines 66 and 68 may be coupled to the inputs of an AND gate 70 which has an output 72 coupled to one input of another AND gate 74.

The apparatus 60 may further include a conventional power supply monitor 76 for monitoring the electrical power supply 32 of the processing system 30 and for generating a signal which is representative of the status of the power supply level. This signal, denoted as $\overline{LOW}$, may be conducted over signal line 78. In one state, the signal indicates that the power supply is below a predetermined level and in another state, the signal represents that the power supply is above the predetermined level. The signal line 78 may be coupled to the other input of the AND gate 74 and also to one input of another AND gate 80. The output signal 82 of the AND gate 74 may be coupled to alternate trigger inputs of the monitoring devices 62 and 64 through a conventional delay circuit 84. In addition, the signal line 82 may also be coupled to the reset input of the processing system 30 and be considered as a reset signal for the purposes of resetting the program being executed to its initial state as shown at 34 in the flow chart of FIG. 4.

The apparatus 60 further includes a circuit for determining the generation of a predetermined number of fault signals within a time interval. In the present embodiment, the signal 82 is provided to the count input of a conventional digital counter 86. The signal 78 may be provided to another input thereof. Still further, the signal 56 may be provided to the counter 86 for reinitializing it to an initial state in accordance with a predetermined time interval. In addition, the counter circuit 86 may include a decoding mechanism for generating a limit signal when the predetermined count of fault signals has been reached within the time interval. This limit signal is conducted over signal line 88 which may be provided to the other input of the AND gate 80 via an inverter 90. The signal 88 may also be used as an alarm signal for initiating an alarm monitor 92 to alert an operator, for example. The output 81 of the AND gate 80 may be provided to another input of the monitoring devices 62 and 64.

In operation, the trigger signals over lines 44 and 46 are set and reset corresponding to the execution of their associated predetermined program portions 36 and 38, respectively. Lack of the trigger signal generation is indicative of a potentially faulty condition with respect to the execution of the program portion associated therewith. For example, in the block diagram of FIG. 3, time intervals may be established in the one-shot circuits 62 and 64 such that timely generated trigger signals will maintain their respective output signals 66 and 68 in one digital state, say a "high" state, for example. The AND gate 70 responds to the aforementioned state by providing a "high" signal over line 72 which is indicative of a nofault condition. On the other hand, lack of generation of a trigger signal beyond the time interval set by the one-shot circuit 62 or 64 renders the corresponding output signal 66 or 68 to change state to a "low" state, for example, which is indicative of a fault signal generation. The AND gate 70 responds to the change of state of either or both of its input signals 66 and 68 to change the state of its output line 72 correspondingly, which indicates that a fault signal has been generated by at least one of the plurality of monitoring devices 62 and 64.

The power supply monitor 76 is operative to override the logic circuits 74 and 80, for example, when the power supply is determined to be below a predetermined level. In the present embodiment, the monitor 76 accomplishes this function by bringing the signal 78 to a "low" state which defeats the operation of the gates 74 and 80 providing a correspondingly "low" state signal at the outputs thereof. In turn, the output signal 81 of the AND gate 80, which is provided to the inhibit input of the circuits 62 and 64, renders the circuits 62 and 64 inoperative when in the "low" state. Moreover, the output signal 82 of the AND gate 74 provided to the processing system 30 maintains the program execution of the processing system 30 in the initial state 34, for example, when in the "low state". The circuit 62 and 64 remain in the inhibited state and the program execution is maintained at the initial state 34 until the "low" signal over line 78 is relieved or changed to the "high" state which indicates that the power supply is above the predetermined level.

Accordingly, with the signal 78 in the "high" state, the AND gates 74 and 80 are enabled and the outputs 82 and 81 thereof follow the states of their respective inputs 72 and 88. That is, a fault indication over signal line 72 correspondingly renders a fault indication over signal line 82 which resets the program execution to the intial state and, after a delay through the circuit 84, restarts the circuits 62 and 64 to suspend the generation of the fault signal over either signal line 66 or signal line 68. Of course, if the faulty condition persists, the trigger signal associated therewith is, once again, not generated in a timely manner causing the corresponding output 66 and 68 to again change state indicating a faulty condition. Sequentially, this renders another restart signal over line 82 to again suspend the generation of the fault signal and reset the programming execution to the initial state 34. Of course, if the fault condition has been relieved or if the fault signal generation was caused by electrical noise, for example, then the restart of the circuits 62 and 64 and the initialization of the program execution will not render another fault signal generation.

The number of fault signal generations are reflected over the signal line 82 which is provided to the fault counter 86. The counter 86 is operative to count the fault signal generations as long as the power supply is above the predetermined level as controlled by the signal line 78. The fault counter 86 may be initialized to an initial state once every time interval as determined in the present embodiment by the instructional set 48 as shown in the program flow chart of FIG. 4. This time interval may be on the order of one day, for example. Should the predetermined count of the fault counter 86 be reached within the predetermined time interval, then the signal 88 may be effected to the "high" state indicating that the fault signal generation limit has been reached. The change in state of signal 88 may cause an alarm monitor 92 to activate and also render the monitoring devices 62 and 64 inoperative by the inhibit signal 81 via AND gate 80 and inverter 90. Conversely, should the predetermined count of fault signal generations not be obtained by the counter 86 within the predetermined time interval, the counter 86 is initialized to its initial state by signal 56 to begin counting anew for the subsequent time interval.

The fault detection system as described in connection with the embodiments of FIGS. 3 and 4 is believed to include advantages over other present systems of this type. For example, the detection system has the capabilities of monitoring the execution of a plurality of program portions with a plurality of monitoring devices and of restarting or suspending any fault signal generation rendered by the plurality of monitoring devices. In addition, the detection system includes circuitry for limiting the number of automatic restarts to a predetermined number which avoids continuous cycling between fault signal generation and reset. Still further, the predetermined number of fault generations must occur within a given time interval, like one day, for example, which may be set and from time to time changed by the program instructions, for example. A fault indication or alarm is not provided until the predetermined number of fault signal generations has occurred within the predetermined time interval. While in the alarm state, the monitoring devices 62 and 64 are inhibited, thus rendering the detection system 60 inoperative, and the program execution is sustained in the initial state. Still further, the apparatus 60 includes a power supply monitor 76 which disables the logic circuitry thereof when the power supply is below a predetermined level to render the fault detection apparatus inoperative and sustain the program execution at its initial state.

The specific circuits of the various functional devices of the apparatus 60 have not been described in detail because the designs therefore are believed well known to a designer of average skill in the pertinent art. The circuits may be implemented with off-the-shelf components and well-known circuit designs. For example, in the present embodiment, the monitoring devices 62 and 64 may include retriggerable one-shot circuits of the type having the model number 54LS122, and operational amplifier comparators of the type having the model number LM139; the restart delay circuit 84 may include a resistor-capacitor network with an operational amplifier comparator of the type having a model number LM139; the power system monitor 76 may include a resistor network and an operational amplifier comparator of the type having a model number LM139; and the gates 70, 74, 80 and 90 may be conventional logic circuits. Moreover, the fault counter 86 may include a digital counter of the type having a model number of 54LS197.

While the present invention has been described in connection with the preferred embodiment shown in FIGS. 3 and 4, it is understood that other similar embodiments may be used or modifications and additions may be made to the described embodiment for performing the same functions of the present invention without deviating therefrom. Therefore, the present invention should not be limited to any single embodiment, but rather construed in breadth and broad scope in accordance with the recitation of the appended claims.

I claim:

1. In a programmed digital signal processing system operative to execute a program having an initial state; and including means for initializing said program execution to said initial state in response to a reset signal, a system for detecting a fault in the program execution of said processing system comprising:

means for generating a plurality of trigger signals, each trigger signal indicative of the execution of a corresponding predetermined portion of said processing system's program, lack of trigger signal generation being indicative of a potentially faulty condition with respect to the execution of the program portion associated therewith;

a plurality of monitoring means, one corresponding to each trigger signal, each monitoring means operative to generate a fault signal in response to a lack of generation of its corresponding trigger signal; and logic means responsive to a fault signal generation from said plurality of monitoring means to generate said reset signal to reinitialize program execution, and to generate a restart signal which is provided to said plurality of monitoring means to suspend said fault signal generation.

2. The fault detection system in accordance with claim 1 including means for monitoring the electrical power supply of the processing system and for generating a low signal when said power supply is below a predetermined level; and wherein the logic means includes means responsive to said low signal to inhibit the operation of the plurality of trigger signal monitoring means and to maintain the program execution of the processing system in the initial state until said low signal is relieved.

3. The fault detection system in accordance with claim 1 wherein each monitoring means includes a retriggerable one-shot circuit which is governed by its corresponding trigger signal.

4. The fault detection system in accordance with claim 1 including means for inhibiting the operation of the plurality of monitoring means upon the generation of a predetermined number of fault signals within a time interval.

5. In a programmed digital processing system operative to execute a program having an initial state; and including means for initializing said program execution to said initial state in response to a reset signal, said program including instructions for generating, during the execution thereof, at least one trigger signal by said processing system, lack of trigger signal generation being indicative of a potentially faulty condition in the program execution, a system for detecting a fault in the program execution of said processing system comprising:

at least one monitoring means operative to generate a fault signal in response to a lack of generation of said trigger signal;

logic means responsive to a fault signal generation from said monitoring means to generate said reset signal to reinitialize program execution, and to generate a restart signal which is provided to said monitoring means to suspend said fault signal generation; and means for inhibiting the operation of said monitoring means upon the generation of a predetermined number of fault signals within a time interval to cause a condition which prevents further program execution.

6. The fault detection system in accordance with claim 5 including means for setting the time interval of the inhibiting means.

7. The fault detection system in accordance with claim 5 including means for monitoring the electrical power supply of the processing system and for generating a low signal when said power supply is below a predetermined level; and wherein the logic means includes means responsive to said low signal to inhibit the operation of the trigger signal monitoring means and to maintain the program execution of the processing system in the initial state until said low signal is relieved.

8. The fault detection system in accordance with claim 5 wherein the monitoring means includes a retriggerable one-shot circuit which is governed by the corresponding trigger signal.

9. The fault detection system in accordance with claim 5 wherein the inhibiting means includes: counting means for counting the fault signal generations; means for generating a signal to inhibit the operation of the monitoring means upon the counter reaching a predetermined count; and means for initializing said counting means at predetermined times in order to set the time interval thereof, whereby if the counter does not reach the predetermined count within the set time interval, the counter is initialized and starts counting again without generating the inhibit signal.

10. The fault detection system in accordance with claim 9 including means for monitoring the electrical power supply of the processing system and for maintaining the counter at an initial state until said power supply becomes greater than a predetermined level.

11. The fault detection system in accordance with claim 5 including means for generating an alarm signal upon the generation of a predetermined number of fault signals within a time interval.

* * * * *